United States Patent [19]
Hill et al.

[11] 3,813,855
[45] June 4, 1974

[54] SEPARATOR

[75] Inventors: Ernest C. Hill; Charles T. Patterson, both of Tulsa, Okla.

[73] Assignee: Combustion Engineering Inc., New York, N.Y.

[22] Filed: Dec. 8, 1972

[21] Appl. No.: 313,223

[52] U.S. Cl. .................................................. 55/440
[51] Int. Cl. ............................................. B01d 45/08
[58] Field of Search ............ 55/440, 441, 442, 443, 55/444

[56] References Cited
UNITED STATES PATENTS
3,517,486  5/1967  Golden ................................ 55/440
3,405,511  10/1968  Halter et al. ......................... 55/440

FOREIGN PATENTS OR APPLICATIONS
403,069  12/1933  Great Britain ....................... 55/440

Primary Examiner—Frank W. Lutter
Assistant Examiner—David Lacey
Attorney, Agent, or Firm—Arthur L. Wade

[57] ABSTRACT

A group of parallel plates are arranged to be mounted in a shell. The plates are shaped to form a series of interlocking trapezoidal ribs in the direction of flow of a fluid stream between the plates. The plates are arranged relative to each other to register the ribs in the parallel plates so they nest within each other. The result is a flow path of serpentine shape in which impact and sheltered liquid flow takes place to separate liquid from the flow stream.

1 Claim, 5 Drawing Figures

PATENTED JUN 4 1974 3,813,855

SEPARATOR

BACKGROUND OF THE INVENTION

1. Field of the Invention

This application relates to separating plural fluid phases by impact and draining. More specifically, the invention provides a tortuous path for gas, as one phase, and impact surfaces for liquid, as another phase. Liquid particles, carried by the gas, strike the surfaces, wet the surfaces and flow down the surfaces in separation from the gas.

2. Description of the Prior Art

The lessons of U.S. Pat. No. 2,349,944 issued May 30, 1944 to P. C. Dixon have guided the design of separator vessel baffles for years. The Dixon baffles were improved as shown by the invention of U.S. Pat. No. 3,413,778 issued Dec. 3, 1968 to Charles A. Lavery et al. Side-by-side tests with other forms of separator structure have shown the Dixon-Lavery concepts embody sound principles of phase separation. Recently, it looks as if impact separator structure will be given a new chance to prove itself.

The art is well-developed with impact structure. A classic form is metallic mesh. Flow streams of gas and liquid have been strained through mesh pads. Of course, liquid particles in the flow stream run into some surface on the mesh. Enough liquid collects to form a drop big enough to gravitate.

No sheltered path can be provided in the mesh for gravitated liquid drops. The gas flow stream is always blowing against the path trying to sweep liquid along through the mesh. So the gas velocity and distribution and mesh thickness and form must all be adjusted to get the liquid to fall out of the mesh and collect in a body below the mesh. There is just no shelter for the liquid flow path.

Shelter, or isolation, of liquid flow paths is a part of the prior art. An example of this concern is disclosed in U.S. Pat. No. 3,405,511 to Halter et al. This patent refers to this type of separator as the "vane-type." This structure forms what is termed "zig-zag" passageways. The flow stream flows along these passageways and the liquids in them "impinge" against a surface. From the impinging surface the liquids flow into "vertically extending drainage channels" which are nothing more than scoops behind the surface on which the liquids impinge.

Halter et al. makes light of the problems of forming vanes. It all goes together easily and the student is left with the assurance that costs are kept under control. One glance at this disclosure shows the position to be untrue. Not only are many parts required; the drainage channels take up a lot of space. This, of course, has to increase the pressure drop problem across the unit.

The present disclosure will use the term "plate" rather than "vane." Rather than "zig-zag," the term "serpentine" will be used as a tortuous form. The term "impinge" will become "impact." Further, "vertically extending drainage channels" will be replaced by "sheltered flow surfaces." Separation will be brought about by impact in serpentine flow defined by plates and an effective drainage system will be made with utmost simplicity. It will be obvious that the present invention will obtain objects of material and labor and weight saving without giving up function.

SUMMARY OF THE INVENTION

A principal object of the invention is to provide a tortuous flow path for gas and liquid particles in which the liquid particles are directed into impact with a surface and flow to a sheltered drain surface.

Another object is to provide a tortuous flow path of serpentine form having an impact surface and a drain surface which are simple extensions of each other and at an angle which provides shelter of the drain surface from the gas flow path.

Another object is to extend the drain surface from the impact surface at an angle from the direction of gas flow so liquid flowing onto the drain surface will, in effect, be removed from the path of the gas flow and be able to descend by gravity to a lower collection of the liquid.

The present invention provides parallel plates of serpentine shape and arranged in vertical planes. A flow stream of gas and liquid particles is directed along a horizontal flow path between the plates and at a right angle to the vertically extended parallel ribs of the serpentine shape of the plates. Each rib has a side comprising a flat surface extended at an angle from the plane of the plate. Liquid particles traveling horizontally impact on a first rib side surface and flow from that surface to a connected drain surface. The horizontal gas flow is directed to parallel the first rib side surface and is then deflected to parallel a second rib side surface and replaced with —a— drain surface. Fluid flow into the larger volume defined by the vertical extending adjacent rib drain surfaces relative to that defined by the adjacent rib side surfaces creates a low pressure zone over the rib drain surface connecting the rib sides, and this rib drain surface is thereby sheltered from the gas flow. The liquid on this surface, sheltered from the gas flow, descends vertically to form a collection of liquid below the plates.

Other objects, advantages and features of this invention will become apparent to one skilled in the art upon consideration of the written specification, appended claims, and attached drawings, wherein;

It is customary, if not traditional, to disclose embodiments of this type of invention in a certain way. The first drawing is usually of a system for moving oil well fluids from a well site through various units for process. One of the units is a separator vessel. Inside the vessel is a baffle unit into which the fluids flow. In this chain of structure, the text finally arrives at the new form of structure which carries out the new result.

Let's reverse this order. The first drawing will be of the baffle section in which the invention centers. After the vital structure, and its function, is set forth, we will show how it fits into the separator shell and how the shell is hooked to the oil well production, or other plural-phase flow stream. The scope of the invention as set forth in the claims should then be easy to understand.

Figure 1:
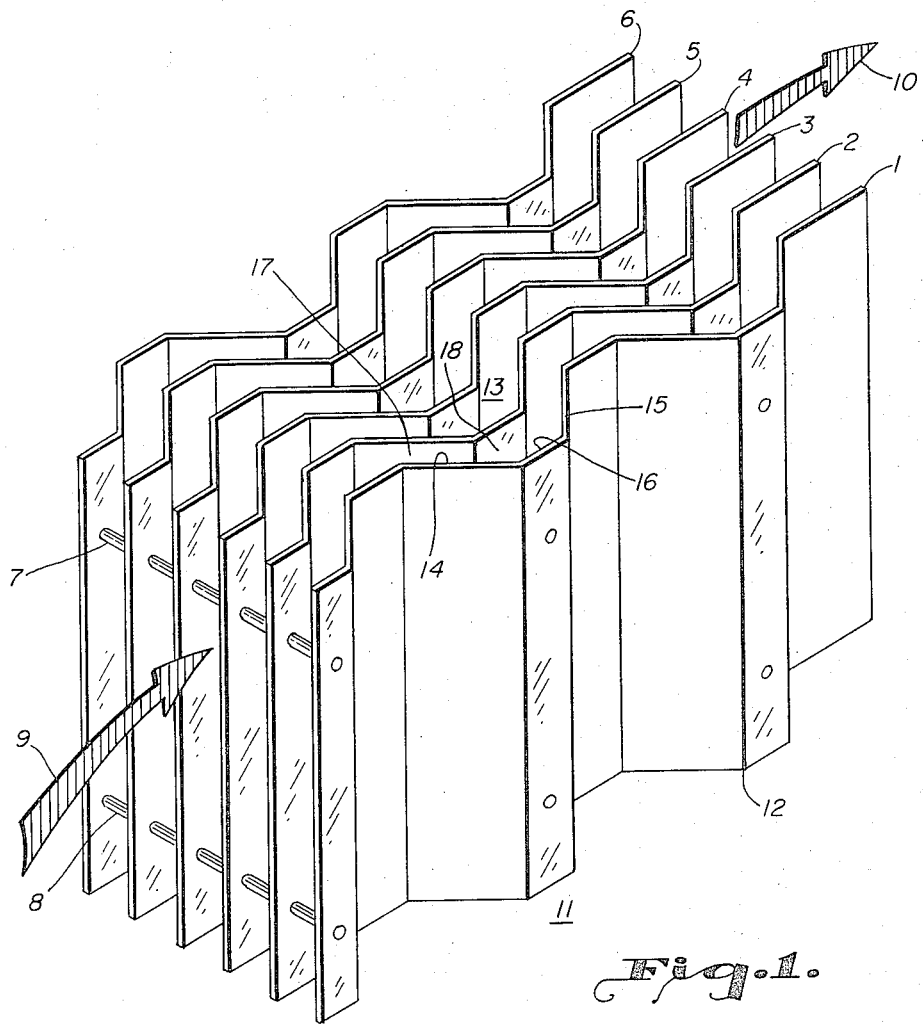
FIG. 1 is a perspective view of a series of baffle plates as a separator unit embodying the present invention.

FIG. 1 discloses a series of plates which make up a baffle section embodying the present invention. Plates 1–6 may be studied in pairs to understand the invention. All of the plates are held in a group by rods. Rods 7,8 can be seen clearly. The plates 1–6 are mounted on these rods in a unit of baffle structure.

The plates 1–6 are held parallel to one another. The horizontal flow stream of fluids is shown to be directed between the plates. Arrow 9 shows the stream flowing from the left as the unit is drawn. Arrow 10 shows the stream flowing out of the unit of plates, to the right.

Ribs are formed in each plate. Take plate 1. Rib 11 and rib 12 are formed from the plate itself. No structure is mounted on the plate. The plate itself is bent into the shape of the ribs. A very simple form.

Note the ribs are formed up and down. This places them at a right angle to the horizontal direction of fluid flow. This vertical form is to be noted. The liquid travelling horizontally in the stream will impact on these rib surfaces and flow down by gravity.

Take one rib to explain the function of them all. Rather, take two ribs of two adjacent plates. Take rib 13 of plate 2. Ribs 11 and 13 are horizontally "aligned" in the baffle unit. We are going to study the passage between these two ribs in these two plates.

Shift attention back to rib 11. Note it is formed of two side surfaces at an angle to the plane of the plate 1. These sides 14,15 are connected by a flat surface 16. The horizontal cross-section of these plate surfaces forming rib 11 can be described as a trapezoid. Ribs 11 and 13 then form a nest of trapezoids, looking at a right angle to the direction of the flow stream. Look at the ribs of each plate in the direction of flow. A series of interconnecting trapezoidal shapes can be seen. What is the result? A serpentine path for the fluids flowing horizontally between the plates.

A serpentine path falls into the broad class of tortuous paths. These are not unknown in the fluid separating art. After all, diverting the direction of a flow of liquid and gas obviously results in impact of liquid on the diverting surface. Once the liquid contacts the surface and wets (clings) to it, the gas moves on. Separation of the two phases has taken place. If the pressure drop across the structure can be accepted, and the liquid can be flowed from the impact surface and collected, you have it made. The trick is in handling the liquid so that it does not get caught up again in the on-coming gas flow stream. We call this reentrainment. When it happens, the liquid is carried on through the "separating" structure with the gas. The equipment fails to separate. The present invention not only drains and collects the liquid impacting on its surface, it does it with the very simple rib-form in the plates 1–6. Here is how it works.

Look at the vertical and parallel rib sides 14 and 17. Take a cross-section at a right angle to these vertical and parallel side surfaces. The fluid mixture, flowing horizontally enters this volume at an angle to the plane of side surface 17. The liquid, heavier than the gas, is carried into impact with surface 17. The capture of such liquid as impacts on 17 is complete. The gas flows on, into the volume between surface 16 and surface 18.

Take a cross-section at a right angle to parallel surfaces 16 and 18. Compare it with the cross-section of sides 14,17. They are unequal. The area between 18,16 is greater than the area between 14,17.

The gas whips around this corner 19, in this larger volume, and forms a low-pressure zone over surface 18. The liquid then, impacted on surface 17, flows around and onto surface 18. The gas stream over the surface 18, forming the low pressure zone above surface 18, is effectively isolated from the liquid beneath it. The liquid is shielded from the gas stream. Say it either way you wish. The separation which took place upon impact is kept by flow of the separated liquid to a zone which the gas flow cannot pick up again. The only way to go is down, and down the liquid flows, to gravitate out the bottom of the baffle section and collect in a body.

Figure 2:
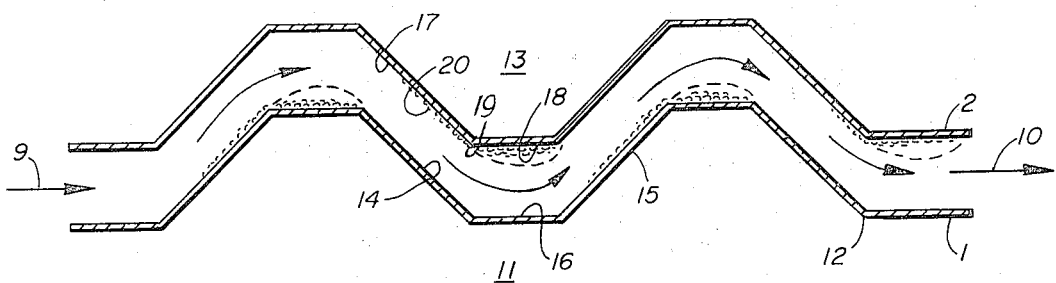
FIG. 2 is a plan view of two of the separator plates.

FIG. 2 may be regarded as a repeat of the FIG. 1 teaching. But, the novelty is simple and repeating it is called for. FIG. 2 is a somewhat diagrammatic plan view of two of the parallel plates. The flow of the liquid, at least, is more clear from this drawing.

Let's assume the plates represent parallel and vertical plates 1 and 2 of FIG. 1. The rods keeping them spaced are not shown. The horizontal flow stream in and out is shown with arrows 9 and 10, just as in FIG. 2.

We can pick up the description at the impact of liquids on surface 17. Now we can number the liquid as 20. This liquid impacted upon surface 17 and is shown flowing from that surface to surface 18.

The arrows between 9 and 10 show the shape of the path followed by the gas. At each change in direction in this serpentine shape, liquids entrained by the gas are thrown upon a surface similar to surface 17. From each impact surface, the liquids flow to the following connected drain surface. Sheltered from the gas flow, these liquids descend for the positive separation which is the end sought by all such structure.

Again, serpentine-tortuous flow patterns are not new to separating baffles. However, a simple, correctly positioned, sheltered drain surface formed from the plate itself, as an extension of the impact surface, is new. This flat surface, vertically extended and sheltered from the gas flow performs better than any comparable prior art arrangement to drain collected fluid from the danger of re-entrainment.

FIG. 1 gives a good view of a number of plates, bound together as a unit of baffle structure. FIG. 2 is a good back-up. Now the unit is to be placed in a vessel.

Figure 3:
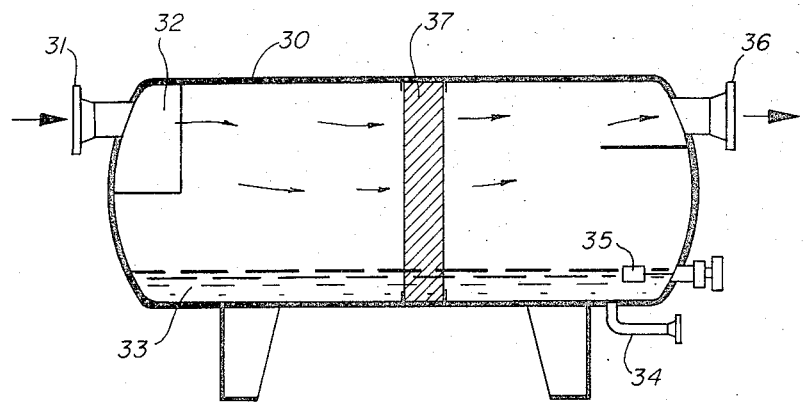
FIG. 3 is a sectioned elevation of a horizontal form of separator vessel in which a unit of plates is mounted.

The vessels can take on many shapes. The horizontal vessel is perhaps most common. FIG. 3 is a horizontal vessel 30 with an inlet 31. Some form of initial impact surface is in a unit placed at 32. The incoming fluids may have a high density of liquid droplets. If so, they will impact upon unit 32 and fall to the liquid collected at 33. All liquid collected in body 33 is drawn from vessel 30 through outlet 34 which is valved under the control of float 35. Gas leaves the vessel through outlet 36, with a very low amount of liquid entrained therein.

The unit 37 is comprised of the plates of FIG. 1. They are sized and provided in the number which will receive the flow stream and reduce its liquid content to the very low required amount. The details of sizing and mounting unit 37 in vessel 30 are not shown in FIG. 3. The unit 37 is mounted so that all of the flow stream passes through the serpentine passages between its plates.

Figure 4:
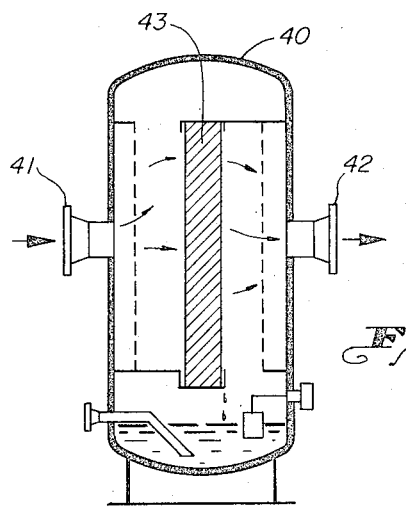
FIG. 4 is another form of vessel in which the unit of plates is mounted.

FIG. 4 shows a vertical separator shell 40 with inlet 41 and outlet 42. Between the inlet and outlet, a separator plate unit 43 is mounted. The inlet and outlet are close to the unit 43. A distributor structure is indicated as useful on both the inlet and outlet sides. In general, the separator performs much as the FIG. 3 separator is operated.

Figure 5:
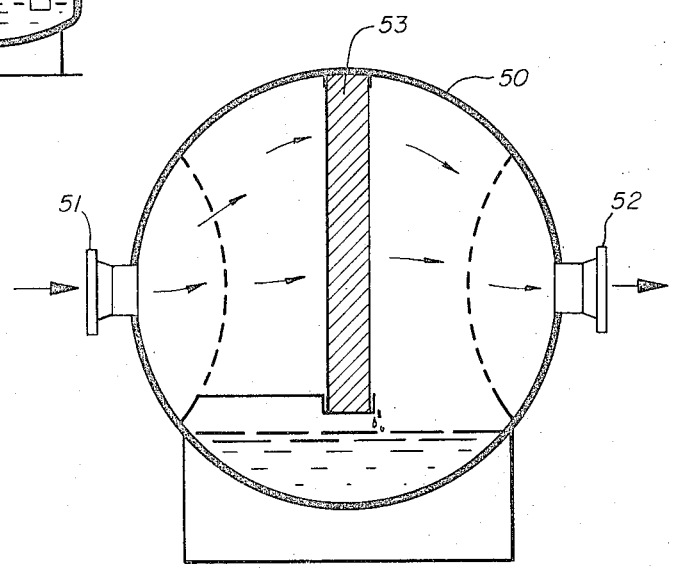
FIG. 5 is another form of vessel in which the unit of plates is mounted.

FIG. 5 is a cross-section of a horizontal shell 50 similar to the FIG. 3 structure. Inlet 51 and outlet 52 are mounted through the sides of this shell 50. Distributors are indicated as mounted over the inlet and outlet. Separator plate unit 53 is extended lengthwise the horizontal shell, between the inlet and outlet. The problems of sizing and mounting unit 53 are rather simple extensions of the problems of FIGS. 3 and 4.

It was the actual test data which has pushed these new impact plates into the separator limelight. The horizontal form of separator of FIG. 3 with the impact serpentine plates proved to separate liquid from gas as well as the horizontal form with Dixon plates but weigh and cost less. More specifically, the FIG. 3 shell form can be as short as two diameters but have the capacity of a twenty foot Dixon plate type. Actual separation tests were conducted on a separator plate unit which was only 8¼ inches thick.

The 24 gauge plates were spaced ⅜ inches apart. The weight of this unit was only about 27 /sq.ft. of inlet face area.

This unit, or section, in the horizontal separator of FIG. 3 gives the results favorably compared with the results of Dixon plates above.

As a final signature to this practical comment on the reduction to practice of the invention, care must be taken to seal around the serpentine plates to prevent gas by-passing along the separator wall. Rolled or straight angles tack-welded touching the wall make a good seal up and down stream.

The unit lends itself well to assembly outside its shell and installation as a rectangular or circular package. Installed, the form will be found to have a very low pressure drop across it; probably less than 1 inch liquid at the maximum rating of the system.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention having been described, what is claimed is:

1. A separator for removing entrained liquid particles from a gas flow stream, consisting of;

a vessel with an inlet connectable to receive gas in which liquid particles are entrained;

an outlet formed in the vessel for the gas from which liquid particles have been removed;

an outlet formed in the vessel for the liquid separated from the gas;

a series of flat parallel plates arranged in vertical horizontally spaced from each other planes and mounted in the vessel between the inlet and gas outlet so the gas with entrained liquid flows horizontally through the passages formed between the plates; and a series of rib structures formed in each plate to extend vertically and at a right angle to the flow of gas and entrained liquid, each rib shaped to provide, a. a first flat side surface extending from the plane of the plate on which the flow stream is received and by which the gas of the stream is directed and on which the liquid of the stream impacts, b. a second flat drain surface connected to the first flat side surface and extending parallel the plane of the plate, c. and a third flat side surface extending at an angle to the plane of the plate and connected to the second flat drain surface, the horizontal cross-sectional area between adjacent rib drain surfaces being larger than the horizontal cross-sectional area between adjacent rib side surfaces;

whereby the gas will follow the horizontal serpentine-shaped path formed by the series of rib structures while the liquid impacts upon each first flat surface of each rib and flows to the second flat surface and descends upon this second flat surface to collect beneath the plates as liquid to be removed from the vessel while the gas flows from the plate passages for removal from the vessel.

* * * * *

UNITED STATES PATENT OFFICE
CERTIFICATE OF CORRECTION

Patent No. 3,813,855          Dated June 4, 1974

Inventor(s) Ernest C. Hill et al.

It is certified that error appears in the above-identified patent and that said Letters Patent are hereby corrected as shown below:

Column 2, line 30, "and replaced with - a - drain surface." should be deleted and replaced with -- also connected to the drain surface. The horizontal cross-sectional area defined by adjacent rib side surfaces of adjacent plates is less than the horizontal cross-sectional area defined by adjacent drain surface of adjacent plates. --. Column 5, line 25, "27   /sq.ft." should read -- 27#/sq.ft. --.

Signed and sealed this 4th day of February 1975.

(SEAL)
Attest:

McCOY M. GIBSON JR.
Attesting Officer

C. MARSHALL DANN
Commissioner of Patents